(12) United States Patent
Cervantes et al.

(10) Patent No.: US 8,161,455 B2
(45) Date of Patent: Apr. 17, 2012

(54) CONCURRENT EXECUTION OF MULTIPLE PRIMITIVE COMMANDS IN COMMAND LINE INTERFACE

(75) Inventors: Ezequiel Cervantes, Tucson, AZ (US); Minghao M. Chu, Tucson, AZ (US); Juan A. Coronado, Tucson, AZ (US); Dinh Hai Le, Tucson, AZ (US); Eric S. Shell, Tucson, AZ (US); Clarisa Valencia, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1113 days.

(21) Appl. No.: 12/023,617

(22) Filed: Jan. 31, 2008

(65) Prior Publication Data
US 2009/0199187 A1 Aug. 6, 2009

(51) Int. Cl.
*G06F 9/44* (2006.01)
(52) U.S. Cl. ........................ 717/115; 717/119
(58) Field of Classification Search .................. 717/115, 717/119
See application file for complete search history.

(56) References Cited

U.S. PATENT DOCUMENTS

| | | | | |
|---|---|---|---|---|
| 5,964,844 | A * | 10/1999 | Rosenthal | 719/310 |
| 7,210,120 | B2 * | 4/2007 | Reyna | 717/106 |
| 7,721,304 | B2 * | 5/2010 | Datla et al. | 719/328 |
| 7,882,291 | B2 * | 2/2011 | Oh et al. | 710/118 |
| 7,885,735 | B2 * | 2/2011 | Katzer | 701/19 |
| 7,970,957 | B2 * | 6/2011 | Mosek | 710/11 |
| 2002/0095438 | A1 * | 7/2002 | Rising et al. | 707/500.1 |
| 2003/0163448 | A1 | 8/2003 | Kilemba et al. | |
| 2004/0103178 | A1 * | 5/2004 | Michael O'Hara | 709/223 |
| 2005/0102440 | A1 * | 5/2005 | Higaki et al. | 710/5 |
| 2006/0047785 | A1 | 3/2006 | Wang et al. | |
| 2006/0129980 | A1 | 6/2006 | Schmidt et al. | |
| 2006/0190579 | A1 | 8/2006 | Rachniowski et al. | |
| 2006/0235968 | A1 * | 10/2006 | Murray et al. | 709/224 |
| 2007/0121668 | A1 | 5/2007 | Moretti et al. | |
| 2007/0124005 | A1 | 5/2007 | Bourakov et al. | |
| 2007/0135949 | A1 * | 6/2007 | Snover et al. | 700/86 |
| 2007/0169008 | A1 | 7/2007 | Varanasi et al. | |
| 2007/0192496 | A1 * | 8/2007 | McCollum et al. | 709/227 |
| 2007/0237147 | A1 | 10/2007 | Quinn et al. | |
| 2010/0241727 | A1 * | 9/2010 | Bourakov et al. | 709/217 |

OTHER PUBLICATIONS

NEC, "Diana Scope—Command Line Interface," Document Rev.1. 17, Mar. 28, 2007, 78 pages.

* cited by examiner

*Primary Examiner* — Anna Deng
(74) *Attorney, Agent, or Firm* — Griffiths & Seaton, PLLC

(57) ABSTRACT

A method to concurrently execute multiple primitive commands in a command line interface (CLI) is provided. Each of a plurality of signal parameters is designated for each of a plurality of primitive commands. The plurality of primitive commands is encapsulated into a header CLI command. The CLI command is executed.

19 Claims, 4 Drawing Sheets

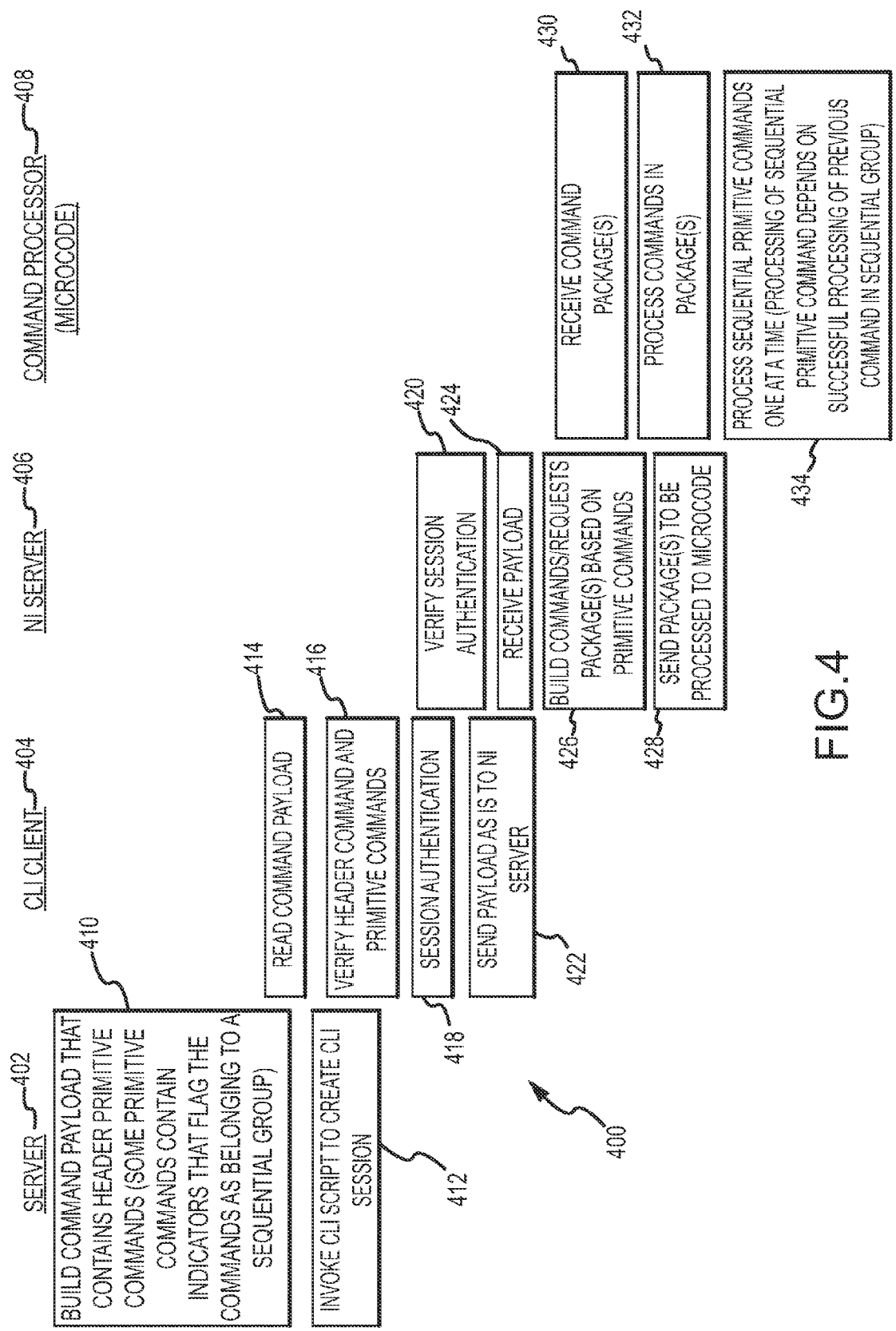

CONCURRENT EXECUTION OF MULTIPLE PRIMITIVE COMMANDS IN COMMAND LINE INTERFACE

BACKGROUND OF THE INVENTION

1. Field of the Invention

The present invention relates in general to computers, and more particularly to a method and computer program product for concurrently executing multiple primitive commands in a command line interface (CLI).

2. Description of the Related Art

In storage controllers, command line interface (CLI) commands are used to configure hardware resources and to utilize existing resources for several different applications. The configuration of hardware resources involves the creation and deletion of resources such as arrays, volumes, volume groups, host connections, and the like. Once the hardware resources are configured, the configured resources can be used for such applications as Copy Services applications (e.g., Flash Copy, Metro Mirror, Global Mirror). In both cases of the configuration of hardware resources and the usage of the existing resources in applications, "primitive commands" and their parameters are used to specify to the CLI the intent of a command request.

While multiple primitive commands may currently be executed in sequence by a CLI, there is currently no mechanism by which multiple primitives commands may be concurrently executed to save computing resources.

SUMMARY OF THE INVENTION

A need exists for a method and computer program product for concurrently executing multiple primitive commands in a command line interface. Accordingly, in one embodiment, by way of example only, a method to concurrently execute multiple primitive commands in a command line interface (CLI) is provided. Each of a plurality of signal parameters is designated for each of a plurality of primitive commands. The plurality of primitive commands are encapsulated into a header CLI command. The header CLI command is executed.

In another embodiment, again by way of example only, a computer program product for concurrently executing multiple primitive commands in a command line interface (CLI) is provided. The computer program product comprises a computer-readable storage medium having computer-readable program code portions stored therein. The computer-readable program code portions include a first executable portion for designating each of a plurality of signal parameters for each of a plurality of primitive commands, a second executable portion for encapsulating the plurality of primitive commands into a header CLI command, and a third executable portion for executing the header CLI command.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 4 depicts an exemplary method of executing multiple primitive commands where some of the primitive commands must be processed in sequence.

DETAILED DESCRIPTION OF THE DRAWINGS

Figure 1:
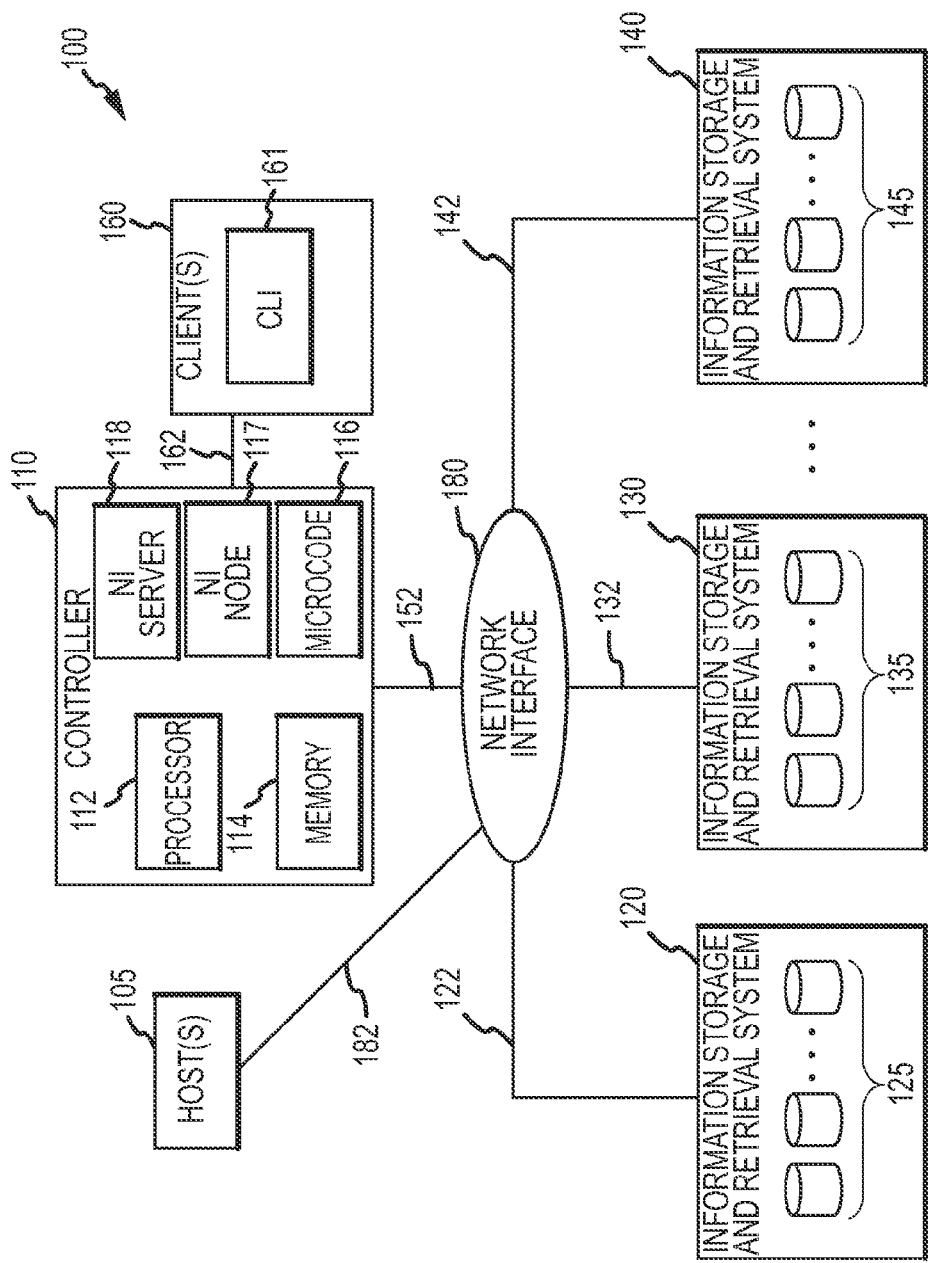
FIG. 1 depicts one embodiment of a computing environment to incorporate and use one or more aspects of the claimed subject matter.

Turning to FIG. 1, an exemplary computing environment 100 is depicted capable of incorporating and using one or more aspects of the following claimed subject matter. As one skilled in the art will appreciate, however, the depicted exemplary embodiment is only one representation of a variety of configurations in which one or more aspects of the claimed subject matter may be implemented.

Environment 100 includes a controller 110 in combination with a plurality of information storage and retrieval systems. For example, in the illustrated embodiment of FIG. 1, environment 100 includes controller 110 in combination with information storage and retrieval systems 120, 130, 140, and additional systems not shown.

In certain embodiments, environment 100 further includes a network interface 180. Network interface 180 may be, for example, a Storage Attached Network ("SAN"), a local area network (LAN), a wide area network (WAN), a private network or combinations thereof. In these embodiments, controller 110 is capable of communicating with network interface 180 via communication link 152.

Controller 110 includes processor 112, memory 114, microcode 116, network interface (NI) node 117, and network interface (NI) server 118. In certain embodiments, memory 114 comprises non-volatile memory, such as for example, one or more EEPROMs (Electrically Erasable Programmable Read Only Memory), one or more flash PROMs (Programmable Read Only Memory), battery backup RAM, hard disk drive (HDD), combinations thereof, and the like. Controller 110 may be deemed a "storage controller" as controller 110 is responsible for at least a portion of storage systems 125, 135, and 145.

An additional server 160 includes one or more command line interface (CLI) clients. CLI 161 may be a script which is executed on the CLI clients 160. In certain embodiments, communication link 162 may be implemented as network interface 180. Additionally, controller 110 further includes network interface (NI) node 117 and NI server 118 for providing communications between a CLI client on server 160 and the network interface 180. Host computer 105 is capable of communication with any of the components of environment 100 using network interface 180 via communication link 182. In other embodiments, host computer 105 may communicate with any of the components of environment 100 directly using for example, a host adapter.

In the illustrated embodiment of FIG. 1, controller 110 is external to each of Applicant's information storage and retrieval systems comprising environment 100. In other embodiments, controller 110 is integral with one of the information storage and retrieval systems comprising environment 100. Additionally, more than one controller 110 may be implemented in a particular application.

Controller 110 is capable of bidirectional communication with information storage and retrieval systems 120, 130, and 140, using network interface 180, communication link 152 and communication links 122, 132, and 142, respectively. In the illustrated embodiment of FIG. 1, controller 110 communicates with a plurality of information storage and retrieval systems using network interface 180, such as for example, a storage area network (SAN). In other embodiments, controller 110 may also communicate directly with any of the information storage and retrieval systems. In yet other embodiments, controller 110 communicates directly with one or more information storage and retrieval systems, and with one or other information storage and retrieval systems using network interface 180.

Communication links 122, 132, 142, 152, 162 and 182, are independently selected from the group comprising a wireless communication link, a serial interconnection, such as RS-232 or RS-422, an ethernet interconnection, a SCSI interconnection, an iSCSI interconnection, a Gigabit Ethernet interconnection, a Bluetooth interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

Information storage and retrieval system 120 includes a plurality of information storage media 125. In certain embodiments, plurality of information storage media 125 comprises one or more hard disk drives, one or more tape storage media, one or more optical storage media, one or more electronic storage media and combinations thereof.

Information storage and retrieval system 130 includes a plurality of information storage media 135. In certain embodiments, plurality of information storage media 135 comprises one or more hard disk drives, one or more tape storage media, one or more optical storage media, one or more electronic storage media, and combinations thereof.

Information storage and retrieval system 140 includes a plurality of information storage media 145. In certain embodiments, plurality of information storage media 145 comprises one or more hard disk drives, one or more tape storage media, one or more optical storage media, one or more electronic storage media and combinations thereof.

As those skilled in the art will appreciate, information and retrieval storage systems 120, 130, and 140, may comprise elements in addition to the plurality of storage media shown. As those skilled in the art will further appreciate, such information storage and retrieval systems may further include, without limitation, one or more processors, one or more data buffers, one or more DASD devices, one or more data caches, one or more input/output adapters, one or more storage device adapters, one or more operator input panels, one or more web servers, one or more robotic accessors, one or more data storage devices which include the plurality of storage media 125 and the like.

As previously described, CLI commands are used to configure hardware resources and to configure existing resources for several different applications. In both cases of the configuration of hardware resources and the usage of the existing resources in applications, "primitive commands" and their parameters are used to specify to the CLI the intent of a command request.

Although the primitive commands provide several parameters that extend the functionality of the primitive command, the primitive commands are limited in scope to perform a single task. For example, for the configuration of volumes to be used in one in flash copy pairs to run in background copy, and in another case for another set of device pairs to run flash copy with no background copy, the same primitive commands are involved that are expanded with parameters to indicate the type of flash copy command to run.

To illustrate, the primitive command "mkflash device_pair_set" may is used to create flash copy pairs with background copy. The primitive command "mkflash-ncopy different_device_pair" is used to create flash copy pairs without background copy.

The above two primitive commands are executed one at a time when CLI is invoked to execute the commands. The primitive commands can be executed in foreground or background mode. In either case, the first primitive command of a list of primitive commands must be completed before the second primitive command can be executed.

Referring again to FIG. 1, when a primitive command is submitted, the CLI client 161 will do syntax checking of the primitive command and its parameters. As a next step, CLI sends the primitive command and parameters to the network interface (NI) server 118. At the NI server 118, software will build one or more packages that contains commands/requests to be processed by microcode 116. Once the package is built, NI software sends the package to the network interface node 117. From there, the package is sent across to the kernel to be processed by the specialized microcode 116 that would handle the command/request from the client 160.

For example, for Copy Services (CS) applications, the software in the NI server converts the primitive command and its parameters into a check key data (CKD) type command. A primitive command that is used for a Copy Services application allows parameters that comprise several devices. The primitive command is expanded into several CKD type of commands, organized as one CKD command per device. Therefore, from one primitive, the NI software can expand the primitive into several CKD commands. Once NI software expands a primitive command into several CKD commands, and a package of CKD commands is built, the software in the NI server sends the package to the network interface node that reside in one of the servers of a storage controller. The NI node then sends the packaged command to the microcode that resides in the kernel to be processed as if the command has come from a host. Once microcode processes all the commands in the package, status for each command is returned to NI server. The NI server then sends back the status to the CLI client.

Although the capability to apply the same primitive command to several devices provides a way to encapsulate in one primitive command several requests, there currently exists no mechanism by which to send several different primitive commands from CLI to the NI server at the same time.

The present description and following claimed subject matter allows for the simultaneous execution of several different CLI primitive commands that have been converted into several different commands/requests understood by microcode at storage controller. To achieve simultaneous execution, a method is disclosed to encapsulate several CLI primitive commands into one payload. Multiple CLI primitive commands may be encapsulated in this way by use of a CLI header command.

The CLI header command may contain a parameter including a signal and its modifier. The signal may indicate the start of a respective primitive command. The signal parameter modifier may be a CLI primitive command. One signal parameter may be designated per each primitive command. In this way, a plurality of signal parameters may be designated for each of a plurality of primitive commands. The signal parameter precedes the primitive command, indicating the start of a primitive command. The CLI header command may be implemented as the first command in the CLI script or shell script.

To illustrate, an exemplary header command and the encapsulate CLI primitive commands may be created according to the following syntax:
header_command -signal primitive_command <parameters> -signal primitive_command <parameters> . . .
Similarly, the header command may follow the description:
>>--header_command--+-- -signal -- primitive_command <parameters> ---+---------+---------><, - . . . -, >

At the client server, CLI may verify the syntax of the header command and each primitive command in the payload. After the syntax is verified, CLI may send the payload to the NI server. Once the payload arrives at NI server, NI software would unpack the payload. The NI software will build one or more packages containing several commands/requests for processing by the storage controller microcode. Finally, NI software would send the packages to the NI node which sends the packages to microcode to be processed.

Although several different primitive commands are packaged into one payload, it is possible that in a particular scenario a particular set of primitive commands may be required to be executed sequentially. To execute commands in sequence, the successful execution of each respective primitive command to be executed sequentially depends on the successful completion of the previous primitive command. If one primitive command of a sequence of primitive commands fails, the following commands are not executed. Examples of such sequential commands are the commands that create a volume and the commands that group some of the newly created volumes into a volume group. Volumes must be created before they are grouped. Although it is possible to create an empty volume group, and then assign volumes to it, if both commands come in the same payload, the commands must be executed sequentially. In one embodiment, to successfully process sequential commands, the <parameters> field of the primitive commands may include an indicator that directs the microcode to execute the commands with the same sequential indicators.

Figure 2:
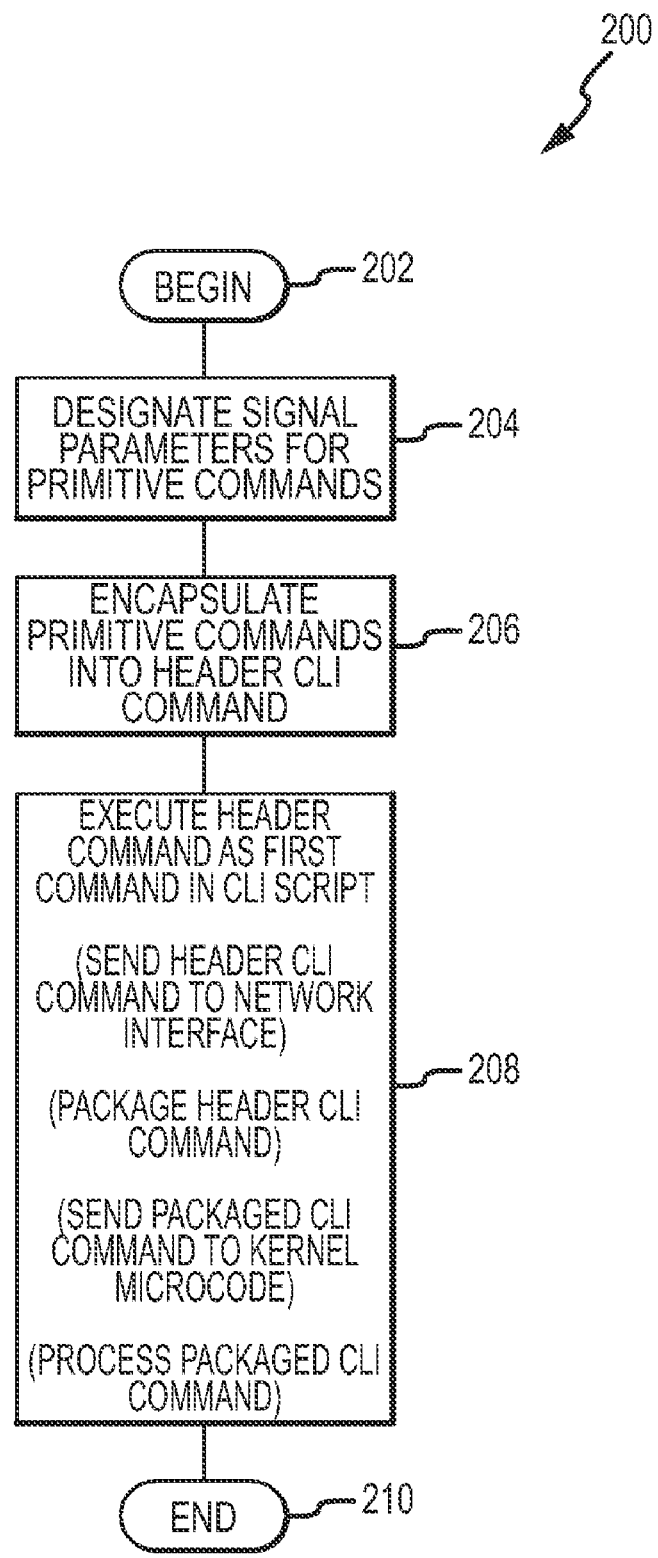
FIG. 2 depicts an exemplary method for concurrently executing multiple primitive commands in a command line interface (CLI)

FIG. 2 depicts an exemplary method of concurrently executing multiple primitives in a command line interface. As one skilled in the art will appreciate, various steps in the method may be implemented in differing ways to suit a particular application. In addition, the described method may be implemented by various means, such as hardware, software, firmware, or a combination thereof operational on or otherwise associated with the storage environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 200 begins (step 202) by the designation of each of a plurality of signal parameters for each of a plurality of primitive CLI commands (step 204). As a next step, the primitive commands are encapsulated as a single package as previously described by use of the CLI header command (step 206). The CLI header command is then executed (step 208). As part of the execution of the header command, the following additional steps may take place. The header CLI command may be sent to the network interface. The header CLI command may be packaged by the NI software (e.g., into a package of CKD commands). The packaged header CLI command may be sent to microcode as previously described. Finally, the packaged header CLI may be processed by the microcode, again as previously described.

Figure 3:
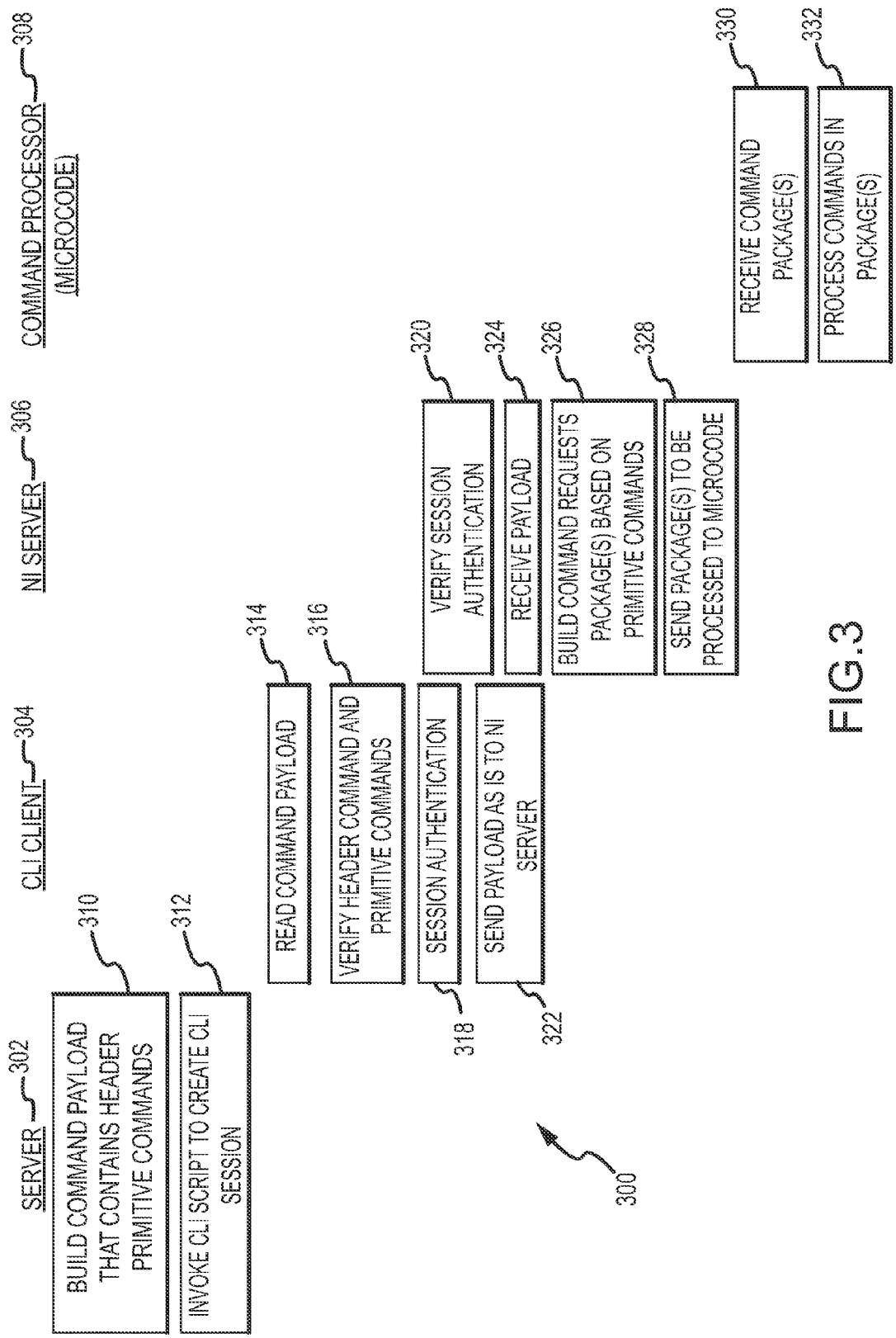
FIG. 3 depicts an exemplary method of executing multiple primitive commands where the primitive commands are independent from one another.

Turning to FIG. 3, an exemplary method 300 depicting the execution of multiple primitive commands is shown. Method 300 assumes that each of the primitive commands are independent from each other. As shown, various components involved in the execution process are depicted, such as a server 302, a CLI client 304, a NI server 306, and a command processor (microcode) 308. Server 302 may be any server, such as an AIX, UNIX, or Windows server that contains the CLI client 304.

Server 302 begins method 300 by building the command payload that contains header primitive commands (step 310). The server then invokes the CLI script to create a CLI session (step 312). The CLI client then reads the command payload (step 314), verifies the header command and primitive commands (step 316), initiates a session authentication (step 318) which is verified by the NI server (step 320), and sends the command payload "as is" to the NI server 306 (step 322).

NI server 306 receives the payload (step 324) and builds commands/requests package(s) based on the primitive commands (step 326). The package(s) are sent to microcode to be processed (step 328). Microcode 308 then receives the package(s) (step 330) and processes the commands in the package(s) (step 332).

A second exemplary method 400 depicting the execution of multiple primitive commands is shown in FIG. 4. Method 400 assumes that at least some of the primitive commands must be executed in sequence as previously described. Again, various components involved in the execution process are shown, including server 402 (similar to server 302), CLI client 404 (similar to client 304), NI server 406 (similar to server 306), and command processor (microcode) 408 (similar to microcode 308).

Server 402 again builds a command payload containing header primitive commands (step 410). In this case, however, some primitive commands contain indicators that flag the particular commands as belonging to a sequential group. Again, a CLI script is invoked to create a CLI session (step 412). Steps 414-428 proceed in a similar manner as depicted in FIG. 3, where the payload is verified, the CLI session is authenticated and verified, the payload is transferred and received, and the package is processed and sent to microcode to be further processed. In microcode, the packages are received and processed (steps 430 and 432). In this case, however, the designated sequential primitive commands are processed one at a time (step 434). Again, the successful processing of these commands depends on successful processing of the respective previous command in the sequential group.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method to concurrently execute multiple primitive commands in a command line interface (CLI), comprising:

designating each of a plurality of signal parameters for each of a plurality of primitive commands, wherein the each of the plurality of signal parameters including a signal and a signal modifier, the signal indicates beginning of a respective primitive command, and the signal modifier is a CLI primitive command, and wherein the designating includes designating a plurality of signal modifiers to modify a plurality of signals included in the plurality of signal parameters;

encapsulating the plurality of primitive commands into a CLI header command in a CLI script; and executing the CLI header command as a first command in the CLI script, wherein the plurality of primitive commands are currently executed.

2. The method of claim 1, further comprising building a command payload that contains the CLI header command.

3. The method of claim 1, further comprising invoking the CLI script to create a CLI session.

4. The method of claim 1, wherein executing the header CLI command includes sending the header CLI command from the CLI to a network interface (NI).

5. The method of claim 4, wherein executing the header CLI command further includes packaging the header CLI command to generate a CLI command package.

6. The method of claim 5, wherein executing the header CLI command further includes sending the CLI command package to a network interface (NI) node.

7. The method of claim 6, wherein executing the header CLI command further includes processing the CLI command package by specialized kernel microcode.

8. The method of claim 7, wherein executing the header CLI command further includes designating a group of the plurality of primitive commands with a plurality of indicators flagging the commands as belonging to a sequential group.

9. The method of claim 8, wherein executing the header CLI command further includes processing the group of the plurality of primitive commands by the specialized kernel microcode in sequential order.

10. A computer program product for concurrently executing multiple primitive commands in a command line interface (CLI), the computer program product comprising a computer-readable storage medium having computer-readable program code portions stored therein, the computer-readable program code portions comprising:

a first executable portion for designating each of a plurality of signal parameters for each of a plurality of primitive commands, wherein the each of the plurality of signal parameters including a signal and a signal modifier, the signal indicates beginning of a respective primitive command, and the signal modifier is a CLI primitive command, and wherein the designating includes designating a plurality of signal modifiers to modify a plurality of signals included in the plurality of signal parameters;

a second executable portion for encapsulating the plurality of primitive commands into a CLI header command in a CLI script; and a third executable portion for executing the CLI header command as a first command in the CLI script, wherein the plurality of primitive commands are currently executed.

11. The computer program product of claim 10, further comprising a fourth executable portion for building a command payload that contains the CLI header command.

12. The computer program product of claim 10, further comprising a fifth executable portion for invoking the CLI script to create a CLI session.

13. The computer program product of claim 10, further including a fourth executable portion for sending the header CLI command from the CLI to a network interface (NI).

14. The computer program product of claim 13, further including a fifth executable portion for packaging the header CLI command to generate a CLI command package.

15. The computer program product of claim 14, further including a sixth executable portion for sending the CLI command package to a network interface (NI) node.

16. The computer program product of claim 15, further including a seventh executable portion for processing the CLI command package by specialized kernel microcode.

17. The computer program product of claim 10, wherein the CLI is operable on a storage controller of a computer storage subsystem.

18. The computer program product of claim 16, further including an eighth executable portion for designating a group of the plurality of primitive commands with a plurality of indicators flagging the commands as belonging to a sequential group.

19. The computer program product of claim 18, further including a ninth executable portion for processing the group of the plurality of primitive commands by the specialized kernel microcode in sequential order.

* * * * *